July 11, 1972    O. D. A. C. FURLONG ET AL    3,676,238

MANUFACTURE OF FLUID LOGIC COMPONENTS FOR FLUIDIC CIRCUITS

Filed Dec. 29, 1969      3 Sheets-Sheet 1

United States Patent Office 3,676,238
Patented July 11, 1972

---

3,676,238
MANUFACTURE OF FLUID LOGIC COMPONENTS FOR FLUIDIC CIRCUITS
Owen Desmond Arthur Charles Furlong, East Coker, and Neil L. Bottrell, Yeovil, England, assignors to Westland Aircraft Limited, Yeovil, Somerset, England
Filed Dec. 29, 1969, Ser. No. 888,352
Int. Cl. B32b *31/14*
U.S. Cl. 156—3
15 Claims

ABSTRACT OF THE DISCLOSURE

Fluid logic components for fluidic circuits are produced by first producing a master design or templet, casting a mold to provide a pattern of the master design or templet, and casting from the mold a unit having cavities or ducts corresponding to the duct system required in the logic element. The cavities and/or ducts are positively sealed and enclosed by sealing or fusing a cover over the duct system. The unit having the cavities and ducts preferably is formed of an epoxy resin, and the cover can be a preformed cover which is bonded to the base unit using an epoxy resin as a sealing material, or the cover can be formed by casting an epoxy resin and catalyst mixture over the base part, after first filling the cavities and ducts with a paraffin wax. The paraffin wax is thereafter removed by heating and flushing with an organic solvent. The sealing of the cavities and ducts can also be accomplished by applying thereover a thin cover plate of reinforced plastic, bonded thereto with a thin adhesive coat of epoxy resin, after which a final bottom plate is bonded to the casting.

BACKGROUND AND SUMMARY OF THE INVENTION

This invention relates to the manufacture of components in fluidic circuits, for use mainly, but not exclusively, in aircraft pressurization and conditioning systems.

In the manufacture of fluid logic devices of the type where a fluid stream or flow from a power nozzle or input duct is diverted into one or more outlet channels by interaction with one or more fluid control jets or streams, it is essential that a positive seal is made between the main body of the element and the cover, to ensure that no leakage occurs between the jets or channels in any other place than the designed location for interaction.

It has been found that many of the elements obtainable commercially are unsuitable, by virtue of the materials used in the construction, expensive manufacture, weight of finished component, and effects upon the finished component by variations in environment. Usually these devices are made in two parts, to enable the complicated channel shapes or narrow ducts or channels to be molded, machined or etched out, and the two parts are joined with a gasket and clamped together. However, this system, although generally satisfactory, is still susceptible to leaks, even when the utmost attention is given to sequence and degree when tightening the clamps.

It is, therefore, an object of the present invention to provide a method of manufacturing ducts, particularly for fluid logic elements which are positively sealed, and do not require a gasket.

It is a further object of the invention to provide a method of manufacturing fluidic elements that enables specialized types of amplifier or amplifier circuits to be constructed at reasonable cost in light weight materials.

Generally in accordance with the invention, we provide a method of manufacturing fluid logic elements including the steps of producing a master design or templet, casting a mold to provide a pattern of the master design or templet, and casting from the mold a unit having cavities or ducts corresponding to the system required in the logic element, and providing means for positively sealing and enclosing these cavities or ducts and means for taking the pipe connections necessary for communication to the cavities or ducts.

Also generally in accordance with the invention, we provide a method of manufacturing ducts or systems of ducts for fluidic circuits including the steps of producing a master templet, taking an impression of said master templet to make a pattern of the duct system in said master templet, the formation of a copy of said master templet using said impression, the filling of the duct system in said copy with a core of castable material, sealing or fusing a cover over the duct system, and the subsequent removal of the castable material from the duct system. The cover may be a preformed cover which is sealed or fused over the duct system, or it may be cast over the filled duct system as a flowable mixture of epoxy resin and catalyst.

Further in accordance with the invention, the enclosing of the cavities or ducts in the fluidic element may be achieved by the introduction of a sealing member, preferably a thin plate of reinforced plastic bonded to the enchanneled face of the element by an adhesive coating, and thereafter covered by a backing plate which is bonded to the enchanneled casting about its peripheries, the sealing member being smaller than the main casting so as to allow a direct bond to take place between the backing plate and the main casting around the peripheries thereof.

Preferably the entire component is formed from an epoxy resin, although metal final backing plates may be added through a diffusion bonding process.

Other and further objects, advantages and features of the invention will be apparent from the ensuing description of preferred embodiments thereof.

DESCRIPTION OF THE PREFERRED EMBODIMENTS

Figure 1:
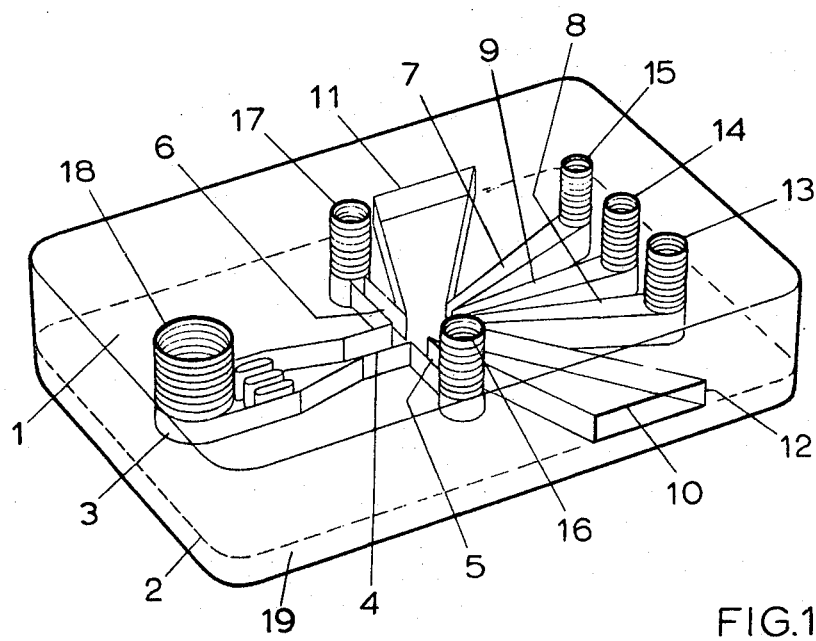
FIG. 1 shows a fluidic device of the direct impact beam deflection type, cast in a transparent material generally in accordance with the invention.
Figure 2:
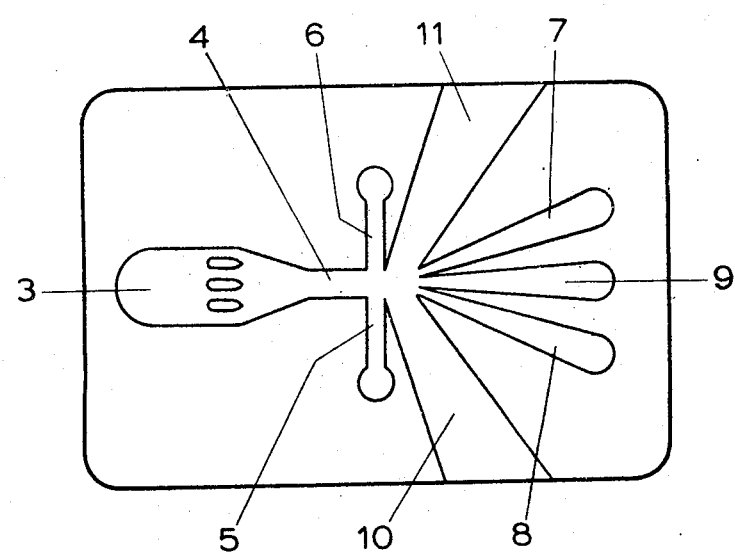
FIG. 2 shows a planform of the device of FIG. 1.

Referring first to FIGS. 1 and 2, in order to prepare a master design or templet of the fluid logic device, a planform is prepared as shown in FIG. 2, and this is photocopied for deep etching onto the surface of a metal block. The metal block preferably is etched using a chemical etching process, commonly referred to as the "powderless process," to form a master design or templet.

Silicone rubber in liquefied form is mixed with an appropriate hardener, and is cast into the etched out master design or templet. A metal plate, coated with a silicone rubber primer, is clamped over the rubber in the master design, and the assembly allowed to cure. The silicone rubber impression attached to the primed metal plate is removed from the master templet, and forms a pattern or mold or casting copies of the master.

To form a copy, an epoxy resin is cast around the rubber impression and allowed to cure. The silicone rubber is removed, and leaves the ducted part of the device recessed into an epoxy resin block similar to part 1 above the interrupted line 2 shown in FIG. 1, with the ducts 3 through 11 inclusive recessed to a depth indicated at 12. Any necessary holes, such as those indicated at 13 through 18 inclusive, are drilled and tapped if required, in the ducted part 1, to provide means for making pipe connections to power and control fluid sources. All the recesses and holes in the ducted part 1 are filled flush to the surface 2 of the epoxy casting with paraffin wax, and a cover 19 of epoxy resin and catalyst mixture is cast over the base part 1. This covering resin 19 fuses with the base part 1 to seal over the channels filled with paraffin wax, and is allowed to cure. The device is then heated to melt the wax, which is then removed, and the ducts cleansed by flushing with an organic solvent, and air dried. In variations of this embodiment, plates, for example of metal, can be attached by a diffusion bonding process to the block 1 or to the cover 19.

Instead of casting the cover 19 over the base part 1 as described above, the cover 19 could take the form of a preformed plate which is bonded to the ducted part 1 using epoxy resin as the sealing material, the cover 19 also preferably, but not necessarily, being preformed of an epoxy resin. The method is otherwise substantially the same as described above, although the use of the paraffin wax filler is not as important when using the preformed cover as when casting the cover over the base part 1.

Other forms of ducts or duct system can be manufactured and sealed using the above described methods, including all the different forms of fluid logic devices, e.g., elements made in nickel from an electro-deposition process, and numerous other materials could be used to form the master design.

Figure 3:
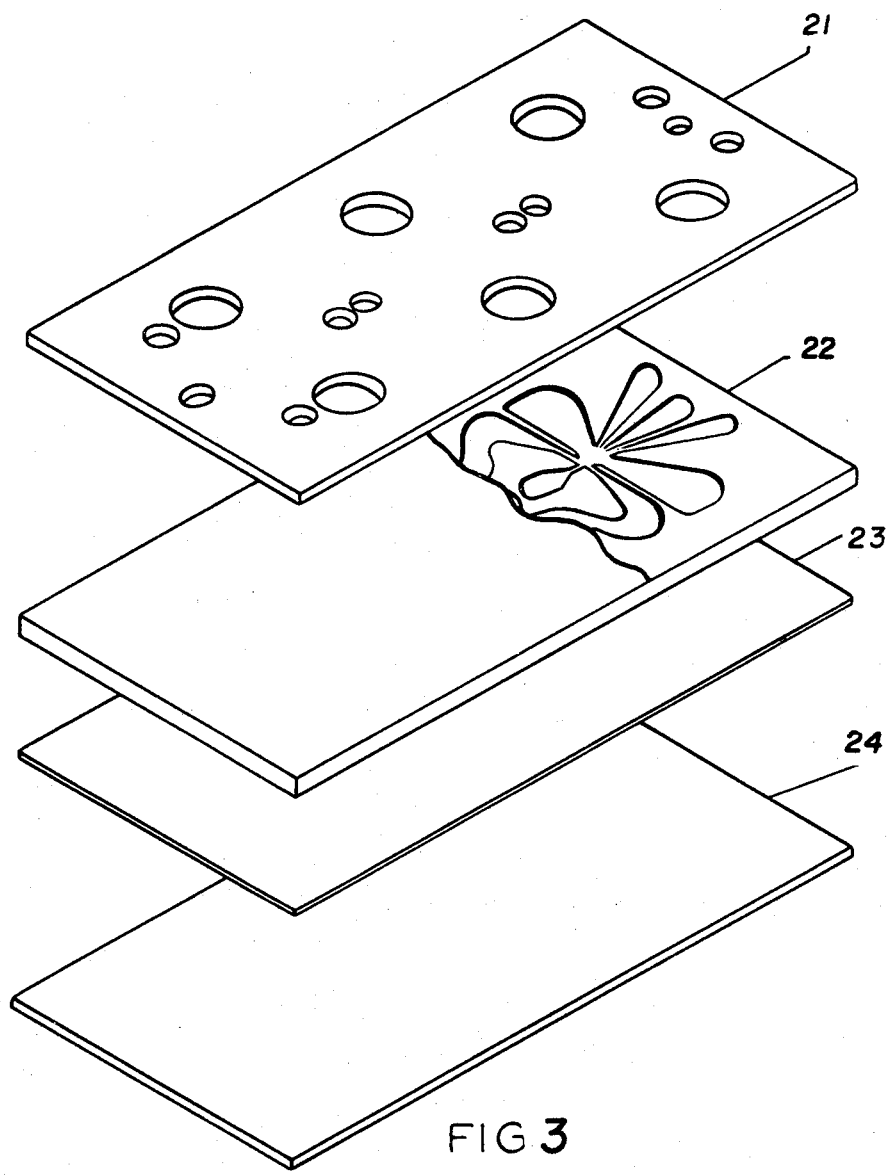
FIG. 3 shows an exploded view of a three-stage amplifier assembly manufactured according to the invention, and generally illustrating the manner of alternate assembly and completion.
Figure 4:
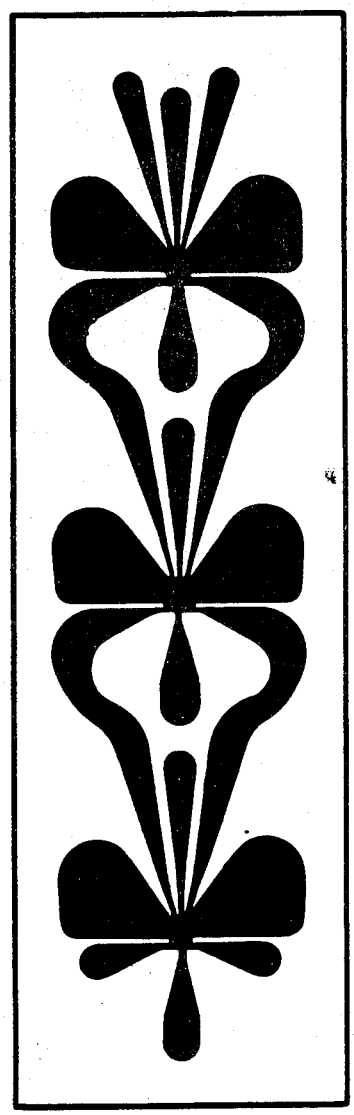
FIG. 4 shows a silhouette of the three-stage amplifier.

Referring now to FIGS. 3 and 4, the initial stage in the embodiment of these figures is the production of a master silhouette (FIG. 4) drawing of the amplifier profile. Using in one specific example a scale of four times full size, the profile is drawn on a dimensionally stable material, e.g. Melanex (a proprietary name). This drawing is photographically copied, then reduced to the exact size required. This ensures that minor errors in the initial large drawing are rendered insignificant. It is then laid on a Dycril plate which consists of a layer of photosensitive material on an alloy backing plate, and given a timed controlled exposure to the collimated light from carbon arc lamps. Dycril, when exposed to ultra-violet radiation, hardens and becomes insoluble to an alkaline treatment. Therefore, this exposure results in a hardening of the exposed portions, while the unexposed portions remain soft. These soft portions are then washed away with a sodium hydroxide solution, leaving an exact pattern of the amplifier on a master alloy plate or templet. An alloy casting frame is now constructed substantially to the external dimensions of the master plate; it has an alloy bottom plate fixed to it, thus forming a shallow trough into which the molding material is to be poured. The Dycril master is then placed in this trough, and the rubber molding solution poured over it. When the rubber cast has cured, the master templet is removed, and the rubber impression prepared for the second casting process. The casting medium used for this operation is preferably a filled epoxy resin material which is poured into the rubber mold and allowed to set for a prescribed period of time. It will be obvious that this process may be speeded up by heating, or the addition of suitable accelerating compounds. After removal from the mold, the epoxy casting 2 is machined to provide a flat backing surface and to remove molding flash, etc. Final curing of the casting may take place before or after the machining process, but it is preferably completed after machining.

A top backing plate 21 of glass reinforced plastic is now bonded by suitable material to the back surface of the casting 22, and the assembly may then be drilled and tapped to take the necessary pipe connectors. As illustrated in FIG. 3, the backing plate 21 may be preformed to include guides or patterns for the drilling. Other methods of attaching and fixing pipe connections may be used.

A thin cover plate 23, in this example a .012 inch thick reinforced plastic sheet, its external dimensions being slightly smaller than the epoxy casting 22, is now bonded with an approximately .0004 inch adhesive coat, to the outer or enchanneled surface of the casting 22. In the previously described embodiments it was disclosed to fill the element channels with wax to prevent adhesive from entering the very small passageways and blocking them. However, in the embodiment of FIG. 3, this step is preferably omitted. It has been found that if a very thin coat of adhesive is applied to the cover or sealing plate 23 and allowed to semi-cure under heat lamps for a certain period of time, the cover plate may then be applied to the casting and given a final cure under evacuation, without any danger of adhesive seepage, into the element channels. The reason for the cover plate 23 being smaller than the main casting 22 is to allow a direct bond to take place around the periphery of the final bottom plate 24 and the main epoxy casting 22.

The use of the thin cover plate 23 provides an important benefit in an inspection stage at this point in the process, that is, before the application of the final bottom plate 24. In order to determine the nature of the bonding between the cover plate 23 and the casting 22, and to establish that no voids or air bubbles exist between the element channels, the assembly is inserted into a bath of water. The cover plate 23, even if already abraded, becomes virtually translucent; the water enters the element, filling the channels, and any voids or areas of poor adhesion in direct association with the channels are shown up in dark relief, and it can be easily seen where leaks between channels may occur. Colored fluids may be used if required.

The assembly, if proven satisfactory, is then dried, the surface of the cover plate abraded if necessary, and the final bottom plate 24 bonded in place. The now finished amplifier can be machined to size and ultrasonically cleaned.

The cover plate 23 preferably is bonded to the epoxy casing 22 in the above manner by using a thermo-setting epoxy resin.

Various modifications may be made to this latter described process without departing from the scope of the invention. For example, the material may be varied to suit the particular application, other operations such as degreasing, heating to speed cure, the removal of air bubbles from the epoxy resin or rubber molding solution prior to casting by evacuation. It may be found necessary to roughen all bonding surfaces by vapor blasting.

In each of the above described embodiments, positive sealing is obtained without the use of gaskets, clamps, etc.

We claim:

1. A method of manufacturing a fluidic circuit component having fluid ducts and cavities therein in a predetermined circuit configuration, comprising forming a mold having raised portions upstanding from its surface corresponding to the desired circuit configuration, casting from the mold a component having a pattern of impressions corresponding to the desired circuit configuration, forming appropriate openings in the component for pipe connections to the circuit, and positively sealing and enclosing the pattern of impressions by bonding a cover member to the impression-bearing face of the molded component.

2. A method as claimed in claim 1 wherein a master templet is produced having a pattern of impressions corresponding to the desired circuit configuration, and the mold is formed by casting a hardenable material onto the impressioned master templet.

3. A method as claimed in claim 2 wherein the master templet is produced by a photo etching process.

4. A method as claimed in claim 2 wherein the master templet is produced by a chemical etching process.

5. A method as claimed in claim 1 wherein a castable material is applied to the impressions in said molded component to fill the impressions flush with the face of the molded component before the cover member is bonded thereto, and the castable material is removed after the bonding of the cover.

6. A method as claimed in claim 5 wherein the castable material is wax.

7. A method as claimed in claim 5 wherein the cover member is bonded to the face of the molded component by casting onto said face a castable epoxy resin and catalyst mixture to fuse with the molded component and seal over the filled impressions, and is then allowed to cure.

8. A method as claimed in claim 1 wherein said cover member is a preformed plate which is bonded to the face of the molded component with an epoxy resin sealing material.

9. A method as claimed in claim 1 wherein the sealing and enclosing of the impressions is accomplished by bonding a sealing member to and over the impressioned face of the molded component between said face and a backing member, said sealing member and said backing member together forming said cover member.

10. A method as claimed in claim 9 wherein the sealing member is a thin plate smaller in length and width than the planform area of the molded component, and said backing member is bonded directly to the peripheral areas of said molded component.

11. A method as claimed in claim 9 wherein the bonding of said sealing member to the impressioned face of said molded component is accomplished by the steps of coating the bonding face of the sealing member with a thin even layer of bonding substance, partially curing the bonding substance prior to bringing the bonding surfaces together, and subjecting the assembly to pressure until the curing cycle is completed.

12. A method as claimed in claim 11 wherein the bonding substance is a thermosetting epoxy resin.

13. A method as claimed in claim 11 wherein the final cure of the assembly is carried out under evacuation.

14. A method as claimed in claim 11 wherein the sealing member is a thin plate of reinforced plastic.

15. A method as claimed in claim 1 wherein the molded component is an epoxy resin casting, and the cover member at least in part is an epoxy resin.

References Cited
UNITED STATES PATENTS

| | | | |
|---|---|---|---|
| 3,255,065 | 6/1966 | Wyckoff | 156—252 X |
| 3,354,542 | 11/1967 | Mallia | 156—252 X |
| 3,405,027 | 10/1968 | Wyckoff | 156—252 X |
| 3,492,523 | 1/1970 | Smith et al. | 156—252 X |

CARL D. QUARFORTH, Primary Examiner

S. J. LECHERT, Jr., Assistant Examiner

U.S. Cl. X.R.

156—155, 246, 252, 285, 330, 280